United States Patent [19]

Couffin et al.

[11] Patent Number: 4,671,948

[45] Date of Patent: Jun. 9, 1987

[54] ANHYDROUS SODIUM TRIPOLYPHOSPHATE

[75] Inventors: Frederic Couffin, Montgeron; Claude Magnier, Paris, both of France

[73] Assignee: Rhone-Poulenc Chimie De Base, Courbevoie, France

[21] Appl. No.: 822,243

[22] Filed: Jan. 24, 1986

Related U.S. Application Data

[63] Continuation of Ser. No. 722,016, Apr. 11, 1985, abandoned, which is a continuation of Ser. No. 516,365, Jul. 22, 1983, abandoned.

[30] Foreign Application Priority Data

Jul. 27, 1982 [FR] France ............................ 82 13065
Apr. 28, 1983 [FR] France ............................ 83 07006

[51] Int. Cl.$^4$ .................... C01B 25/26; C01B 15/16
[52] U.S. Cl. .................................. 423/315; 423/305
[58] Field of Search ............. 423/305, 307, 308, 312, 423/313, 314, 315; 159/48.1; 23/313 R, 293 A

[56] References Cited

U.S. PATENT DOCUMENTS 3,562,768 2/1971 Edquist et al. ...................... 423/315
4,265,702 5/1981 Prudhon et al. ............... 159/48.1 R

FOREIGN PATENT DOCUMENTS 799429 8/1958 United Kingdom ............... 423/315

*Primary Examiner*—Gregory A. Heller
*Attorney, Agent, or Firm*—Burns, Doane, Swecker & Mathis

[57] ABSTRACT

A novel anhydrous sodium tripolyphosphate, well adapted for detergency applications, has an X-ray diffraction pattern essentially characterizing a phase I sodium tripolyphosphate; a viscosity, in aqueous medium, characterizing a phase II sodium tripolyphosphate; a rate of hydration characterizing a phase I sodium tripolyphosphate; and which exhibits an ROH at 1 minute of greater than about 90° C.

2 Claims, 1 Drawing Figure

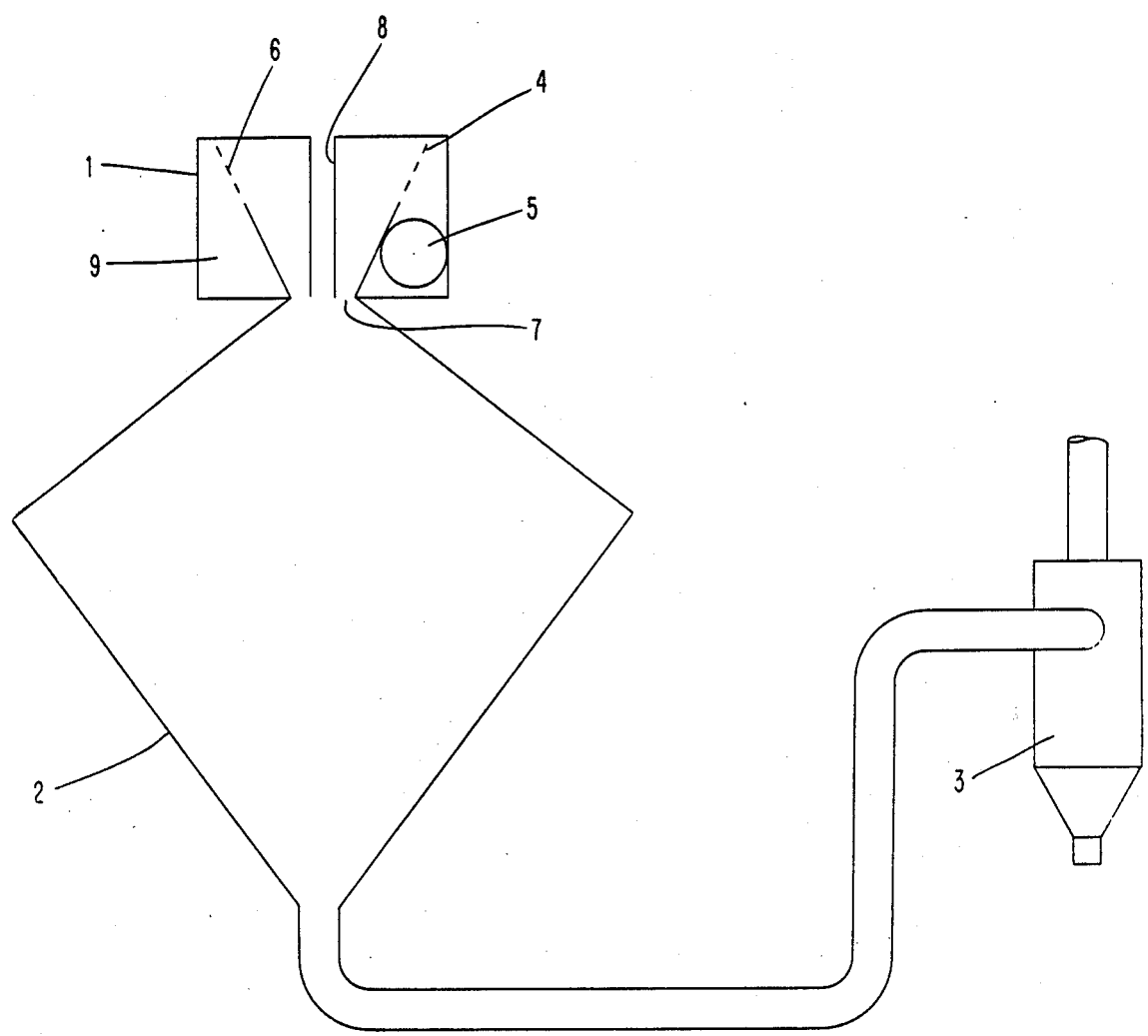

ANHYDROUS SODIUM TRIPOLYPHOSPHATE

This application is a continuation of application Ser. No. 722,016, filed Apr. 11, 1985, both now abandoned.

BACKGROUND OF THE INVENTION

1. Field of the Invention

The present invention relates to a novel sodium tripolyphosphate having a high rate of hydration, to detergent compositions comprised thereof, and to sprayable slurries for the preparation of such compositions by atomization.

2. Description of the Prior Art

It is known to this art that the preparation of detergents includes a first step designed to convert anhydrous sodium tripolyphosphate (TPP), in as quantitative a manner as is possible, into hexahydrated sodium tripolyphosphate, in the aqueous detergent medium comprising the other constituents of the detergent.

The slurry resulting from the first step is then atomized in an atomization tower to provide the detergent in powder form. Such quantitative conversion of anhydrous TPP into hexahydrated TPP is necessary in order to ensure that the detergent users do not experience the disadvantages of the detergent forming lumps, and an excessive amount of heat being evolved, as would be the result in the case of incomplete hydration of the anhydrous TPP.

Therefore, the first property required of TPP is that it should be capable of undergoing hydration as rapidly and as quantitatively as possible.

The second property required is a viscosity which permits the slurry produced from the TPP to be pumped and sprayed.

The aforenoted hydration properties are closely linked to the quality of the TPP (proportion of pyrophosphate and polyphosphate), and other characteristics such as grain size, proportion of phase I, and the like.

Thus, in the case of a TPP destined for the production of a detergent powder by atomization, the choice of the TPP is generally in favor of a TPP having a high proportion of phase II, which makes it possible to reduce viscosity, but unfortunately to the detriment of the rate of hydration.

European patent application No. 81/13221 (EP 70 216), filed July 6, 1981, and corresponding to copending application, Ser. No. 395,114, filed July 6, 1982 and assigned to the assignee hereof, relates to the thermal and/or chemical treatment of a fluid dispersible phase, e.g., a aqueous solution of monosodium and disodium orthophosphates, by means of a dispersing gaseous phase, characterized by, in succession and without interruption;

(i) establishing a vertically descending current of axially extending, axially symmetrical helical flow of a hot gaseous phase;

(ii) separately establishing a second phase liquid current of coaxially downwardly vertically extending, rectilinear continuous jet stream of the, e.g., aqueous orthophosphate solution noted above;

(iii) maintaining said currents of said first hot gaseous and said second liquid, e.g., orthophosphate phases physically separate from each other;

(iv) circulating and directing said currents which comprise the respective plural phases to a low pressure zone of restricted flow passage with respect to said helical flow;

(v) at said zone of restricted flow passage, converging and intimately, homogeneously admixing said plural currents, and atomizing into a multitude of droplets, and entraining/dispersing and thermally dehydrating said rectilinear jet stream liquid orthophosphate current as unit volumes within said helical spinning current of hot gas; and (vi) at the zone of convergence of the respective phases the first phase helical flow of hot gas is such that the momentum thereof is at least 100 times greater than the momentum of the second phase, coaxial rectilinear flow of the orthophosphate solution being thermally dehydrated.

Thus, said thermal dehydration is advantageously homogeneously conducted via flash treatment in a zone of plug-flow of the atomized droplets of feed solution and completed in an isothermal zone, with such treatment being both substantially isothermic and chemically homogeneous, in a region of homogeneous flow in the sense of distribution of the residence times.

And French application No. 81/13223, corresponding to pending application, Ser. No. 305,600, filed July 6, 1982, also assigned to the assignee hereof, features a novel sodium orthophosphate having a Na/P ratio of essentially 5/3, which has but a single crystalline phase and a novel and characteristic X-ray diffraction pattern.

Such a product may be obtained by carrying out the process described above, under particular and specific operating conditions. For a more detailed description of the applicable methodology, see copending application, Ser. No. 395,798, filed July 6, 1982, also assigned to the assignee hereof.

More particularly, as claimed in said French application No. 81/13221, and copending application, Ser. No. 395,114, it is possible to produce a novel tripolyphosphate which displays zero solidification or caking in a quiescent solvent medium.

Advantageously, the TPP does not comprise any insoluble fraction. It exhibits a surprising behavior in regard to solubilization, in consideration of the proportion of phase I and the granulometry thereof.

SUMMARY OF THE INVENTION

Accordingly, a major object of the present invention is the provision of a TPP having a high rate of hydration and which can be formulated into pumpable and sprayable slurries.

Briefly, the present invention features:

(1) preparing a solution of mono and dibasic sodium orthophosphates having an overall Na/P molar ratio ranging from 1.64 to 1.70;

(2) establishing a symmetrical axial flow/vortex flow system comprising a helically vertically descending hot gaseous carrier phase having a high degree of momentum;

(3) introducing the orthophosphate solution prepared on (1) into the region which is in a condition of relative depression in said spinning flow configuration such as to effect dispersion and thermal treatment of said orthophosphate solution by the gaseous phase, thereby to produce tripolyphosphate; and (4) subjecting the product produced in step (3) to a complementary thermal treatment.

It will be appreciated that the methodology circumscribed by the aforementioned parameters (1) to (3) is essentially that described in the aforesaid copending applications, Ser. Nos. 395,600, 395,114 and 395,798.

BRIEF DESCRIPTION OF THE DRAWING

The FIGURE of Drawing is an axial, diagrammatical cross-sectional view of one embodiment of an apparatus suitable for carrying out the process according to the invention.

DETAILED DESCRIPTION OF THE INVENTION

More particularly according to the present invention, the ratio in respect of momentum as between the gaseous and liquid phases is advantageously higher than 100 and preferably ranges from 100 to 10,000.

Advantageously, the speed of introduction of the initial solution into the treatment zone is low and is preferably below 10 m/second.

Preferably, the pressure of the gaseous phase is also low, below $10^5$ Pa.

Advantageously, the initial solution may be produced by neutralization of wet-process $H_3PO_4$ by means of NaOH, wherein the acid either may or may not have been previously subjected to purification by solvent extraction. It is also possible to use an acid produced by thermal process.

As hereinbefore mentioned, the $Na_2O/P_2O_5$ molar ratio of the starting solution ranges from 1.64 to 1.70. The starting solution comprises from 15 to 55% of dry extract (by weight).

The temperature for treating the solution in step (3) ranges from 300° to 450° C.

The TPP produced is subjected to the complementary thermal treatment in step (4) at a temperature of from 400° to 500° C., either by extending the region (3) or by performing such treatment in a separate region.

If the complementary thermal treatment is performed by extending the region (3), namely, in a continuous mode, the treatment time advantageously ranges from 0.5 to 10 seconds.

If the complementary treatment is effected in discontinuous fashion, the treatment time advantageously ranges from 1 to 60 minutes.

The process according to the invention surprisingly results in a product which combines qualities which hitherto were considered to be contradictory, namely, a low level of viscosity, which is a characteristic attributable to the presence of the phase II, and a high rate of hydration, which is a characteristic attributable to the presence of the phase I.

The final product, therefore, is not only novel, but also combines the advantages of the two phases which were known and heretofore used, while at the same time providing levels of quality which are higher than the sum of such levels of the two phases I and II when considered separately.

While not wishing to be bound by or to any particular theory, the rheological performance of the product according to the invention is very different from the performance of the TPP which has to date been studied, even though the structure, as determined by X-ray analysis, corresponds to that of a phase I.

However, it is known that the performance of the substance depends not only on the TPP but also other components which are included in the composition in a detergent formulation.

And these include, in particular, surfactants which have a detergent function. Among same, the non-ionic surfactants are the most demanding, in particular from the point of view of viscosity, when the TPP is of phase I type.

Surprisingly, though, it has now been found that it is possible to produce slurries for spraying and atomization, which have a low level of viscosity, even in the presence of surfactants such as those of anionic or non-ionic type.

This invention therefore features a detergent composition which results in a sprayable slurry based on sodium tripolyphosphate, having a high rate of hydration, which contains surfactants and, in particular, non-ionic surfactants.

A sprayable slurry according to the invention advantageously comprises, by weight:

(i) from 10 to 40% of sodium tripolyphosphate calculated on an anhydrous basis;

(ii) from 1 to 20% of surfactants;

(iii) from 10 to 30% of various adjuvant compounds (silicates, sulfates, soaps and various additives); and (iv) from 20 to 60% of water.

The surfactants are advantageously of anionic type such as sodium dodecylbenzene sulfonte (or LAB) or non-ionic type such as straight chain ethoxylated alcohols, such as, for example, $C_{11}$ to $C_{18}$ ethoxylated alcohol fractions, containing from 6 to 50 mols of oxyethylene.

The tripolyphosphate according to the invention may also be used as a co-builder (detergency co-auxiliary) and in particular may be associated with a zeolite of type A.

In that case, one difficulty to be overcome is that of avoiding hydrolysis of the TPP when the slurry is dried by atomization.

It has now been found that, broadly speaking, the degree of hydrolysis of TPP in phase II, in the presence of zeolite, is less than that of TPP in phase I.

Now, in the case of the TPP according to the invention, it exhibits a behavior which approaches that of a phase II, which corroborates the immediately aforesaid.

In accordance with one embodiment of this invention, from 25 to 75% by weight of TPP in the composition may be replaced by a sodium zeolite of type A or type 13X.

For a more detailed description of apparatus/means and certain methodology for carrying out the process according to the invention, compare French Pat. Nos. 2,257,326 (corresponding to Ser. No. 916,477, filed June 19, 1978, assigned to the assignee hereof), 2,419,754 (corresponding to British Patent Specification No. 2,017,523), 2,431,321 and U.S. Pat. No. 4,257,339. Cf. U.S. Pat. Nos. 4,124,353, 4,263,234, 4,265,702 and 4,267,131, published European Patent Application No. 0,007,846, and especially the aforesaid Ser. No. 395,798 copending application, all assigned to the assignee hereof.

Suitable predispersion technique and/or chemical treatment may also be carried out simultaneously; respectively compare published French Application Nos. 80/17960 and 80/20464, both also assigned to the assignee hereof.

The product according to the invention is suitable for a wide variety of uses but in particular is remarkable, on the one hand, by virtue of a high rate of hydration and, on the other hand, in that it results in slurries which can be facilely pumped and sprayed.

The rate of hydration was ascertained in two different ways:

(A) By the test referred to as the ROH test, in the following manner:

200 cm$^3$ of boiling distilled water were introduced into a Dewar vessel containing 50 g of anhydrous Na$_2$SO$_4$. The mixture was mechanically agitated by means of a screw rotating at a speed of 900 rpm.

When the temperature reached 80° C., 150 g of the TPP to be tested were added over a period of 5 seconds. The variation in temperature was then measured.

(B) Measuring the rate of hydration:

350 g of a reference slurry containing 55% of dry solids was formed, of the following composition:

|  | % in respect of slurry |
|---|---|
| (i) Na D.D.B. sulfonate | 9 |
| (ii) Na stearate | 1.5 |
| (iii) Na silicate - R = 2 | 2.5 |
| (iv) Anhydrous Na sulfate | 11 |
| (v) STPP | 31 |
| (vi) Water | 45 |
| Total | 100.00 |

The sulfonic and stearic acids were mixed, being neutralized under cold conditions by a 10% solution of caustic soda.

After saponification, the diluted sodium silicate was added, followed by the sodium sulfate, and the temperature was adjusted to 80° C. The TPP was added when the temperature reached 80° C. (it is from that moment that the performance or behavior of the slurry was studied by means of the methods set out below).

During the operation of producing the slurry, samples were taken, to evaluate the degree of hydration of the TPP (% of hydrated TPP relative to the total TPP present).

On one sampling, hydration was terminated after a period t of 20 minutes by immediate dispersion of the sample in an alcohol/formamide (50/50) mixture.

The surfactant portion was then removed by a number of treatments with alcohol and filtration over sintered glass.

The non-hydrated fraction of the TPP was then determined by a step involving absorption of water, removal of the excess water in a drying oven and weighing the completely rehydrated sample.

The time required to achieve 100% hydration was also noted.

The rise in temperature in the hydration operation was measured. That increase in temperature ($\Delta T$) represents the temperature difference after complete hydration; the symbol $\delta T$ will denote the temperature difference observed at a time t.

(C) Evaluation of the viscosity of the slurry:

The variation in the viscosity of the reference slurry during production thereof was followed by recording the amperage or the variation in voltage consumed by a motor driving an agitator.

The speed of rotation of the agitator was maintained at a constant level, at 300 rpm or at 750 rpm.

The aforementioned amperage or voltage were proportional to the viscosity and therefore recording the variations in amperage or voltage made it possible to ascertain the increase in viscosity over time and in particular made it possible to ascertain the period of time required to achieve maximum viscosity.

The following examples employed a d.c. AXEM motor supplied by the company Electro Mecanique of type F 12 M 4, using an operating output of 240 watts.

The tripolyphosphate according to the invention advantageously had an ROH at 1 minute of more than 90° C., and preferably at least equal to 95° C., while imparting to the slurries a level of viscosity which permitted same to be pumpable and sprayable, namely, a viscosity below 1.5 and preferably below 1.2 m A in accordance with the test described or lower than 150 mV, preferably lower than 120 mV.

In order to further illustrate the present invention and the advantages thereof, the following specific examples are given, it being understood that same are intended only as illustrative and in nowise limitative.

In said examples which follow, and referring specifically to the FIGURE of Drawing, suitable apparatus for carrying out the process according to the invention included a phase contactor/separator comprising a dispersing "head" 1, a double-cone treatment vessel 2, and a cyclone separator 3.

The head 1 comprised an inverted, truncated and unpwardly perforated cone 4 downwardly depending from a cylindrical casing member and defining an annular space 9. Coaxial therewith is an internal tubular conduit or inlet pipe 8 for the orthophosphate solution feedstream, the same coaxially extending through the upside end of the casing member and deep within the truncated cone 4, said truncated cone 4 terminating in an outlet 7 or confining zone of restricted flow passage. The perforations 6 enable the establishment of a regularly repeating, helical path of axially extending downward flow which is essentially summetrical with respect to at least one plane passing through the axis of the helical flow, such flow being established by means of the helical trajectory inducing tangential inlet 5 for the hot gaseous phase. The wall member comprising the treatment vessel 2 is integral with the outlet 7.

It will be seen that the orthophosphate solution is fed through the conduit 8 into the low pressure zone of the helical flow of hot gas, i.e., into the upstream end of the double-cone treatment vessel 2.

The treatment gases were introduced into the tubular space, in a hot condition

The thermal treatment performed in accordance with step (4) was carried out in an apparatus which is not illustrated and which comprised a tubular furnace, in the course of a separate operation.

Each TPP set forth in the examples was produced from a solution of orthophosphate of technical quality (acid resulting from the attack or acidulation of the ore by neutralized and filtered H$_2$SO$_4$).

(A) Production of the TPP:

A solution containing 19.6% P$_2$O$_5$, 14.2% (Na/P=1.66) and the following impurities (Na$_2$SO$_4$: 2.8%; NaF: 0.2%; SiO$_2$: 0.14%; NaCl: 0.3%; Ca: 400 ppm; Mg: 400 ppm; sum of the metal impurities: 1000 ppm) was sprayed by a stream of air heated to a temperature of 930° C., and at a flow rate of 50 Nm$^3$/hour. The flow rate of the solution was adjusted such as to produce a temperature upon discharge of the gases and the product of 450° C.

That product, which was primarily in TPP form (TPP No. 1), was subjected to complementary heating in a tubular furnace at a temperature of 500° C. for a period of 10 minutes (TPP No. 2).

The following Table I reports the chemical characteristics of TPP Nos. 1 and 2 and those of a commercial TPP of identical quality, produced in a rotary furnace at a temperature of 450° C. (TPP No. 3) and further subjected to treatment in the furnace at 500° C. (TPP No. 4).

TABLE I

| | Process | Phase I + Phase II | Pyro % | Poly % | TPP % |
|---|---|---|---|---|---|
| TPP No. 1 | TPP No. 1 | 17 | 30 | 1 | 69 |
| TPP No. 2 | TPP No. 1 further treated in the furnace at 500° C. | 87 | 2 | 0 | 98 |
| TPP No. 3 | TPP (rotary furnace) | 20 | 3 | 0 | 97 |
| TPP No. 4 | TPP No. 3 further treated in the furnace at 500° C. | 77 | 2 | 0 | 98 |

(Phase I column values: 17, 87, 20, 77 — Note: "Phase I" and "Phase I + Phase II" are separate columns.)

(B) Prehydration of the TPP:

These four TPP samples were prehydrated before the tests in an identical fashion by spray of water in such a fashion that the heat loss thereof at 350° C. was about 1.5%.

EXAMPLE 1

The results obtained are reported in Table II.

TABLE II

| TPP No. | ROH 1 min | ROH 5 min | ΔT (°C.) | Rate of Hydration at 20 min | Time for obtaining 100% of hydration | Maximum Viscosity D max (mA) | Time D max |
|---|---|---|---|---|---|---|---|
| 1 | 85 | 87 | 6 | 60 | >2 hours | 0.12 | >2 h |
| 2 | 95 | 95.8 | 12.5 | 100 | 13 min | 1.06 | <5 min |
| 3 | 83.5 | 90.1 | 4.8 | 70 | 70 | 0.88 | 50 |
| 4 | 93 | 93.7 | 10 | 98 | 30 | 1.56 | 15 |

TPP No. 1 had a low rate of hydration and was low in viscosity.

The rate of hydration was very substantially enhanced by a complementary thermal treatment at a temperature of 500° C., in accordance with the invention (TPP No. 2).

It was higher than that measured as regards each TPP which was produced in the rotary furnace, whether or not each had been subjected to the same complementary treatment.

It was found that the viscosity of the slurry produced with TPP No. 2 had increased.

However, that viscosity remained at a value which permitted the slurry to be pumped and sprayed.

If a comparison is drawn in particular with TPP No. 4, it was noted that the treatment that it had undergone, in comparison with TPP No. 3, provided for an increase in the ROH, the proportion of phase I, and the amount of hydration, but that the viscosity was now at such a level as to be incompatible with use thereof, even though its proportion of phase I was lower than that of the product according to the invention.

EXAMPLE 2

The following medium was produced, utilizing TPP No. 2:

| (i) Anhydrous TPP | 37.5% |
|---|---|
| (ii) Anhydrous Na$_2$SO$_4$ | 12.5% |
| (iii) Water | 50% |

The same apparatus as that employed above was also used in this Example, but at a speed of rotation of 750 rpm, while tracing the variation in voltage, which represented the variation in the viscosity of the slurry and the rise in temperature.

As can be seen from the following Table, when the TPP according to the invention was used, it was observed that there was a rapid rise in viscosity at 1 minute, followed by a drop in viscosity to a value markedly lower than that of commercial TPP (Nos. 5 and 6) which were identical in chemical purity to TPP Nos. 3 and 4, except that they had different proportions of the various phases.

TABLE III

| TPP | Phase I | Viscosity in mV Maximum | 1 min | 2 min | 5 min | 10 min | Stabilization | δT °C. | Min |
|---|---|---|---|---|---|---|---|---|---|
| No. 1 | 87 | 64 at 1 min | 64 | 30 | 22 | 23 | 24 | 12 / 10 | 1 min |
| No. 5 | 0 | 74 at 3 min 30 | 37 | — | 70 | 70 | 70 | 8 / 13 | 1 min / 5 min |
| No. 6 | 31 | 91 at 10 min | 29 | — | 90 | 91 | 91 | 9 / 12 | 1 min / 5 min |

It may be considered that such unusual behavior, namely an abrupt rise in viscosity, directly linked to an abrupt rise in temperature, would be due to the formation of crystals of TPP, 6.H$_2$O, which, under the effect of a severe shearing force, would undergo a modification in morphology, accompanied by the instantaneous production of a highly fluid slurry.

EXAMPLE 3

This example demonstrates the influence of a non-ionic surfactant, in order to extrapolate to the most demanding conditions which may be encountered when preparing detergent formulations.

| | Medium No. 1: |
|---|---|
| (i) TPP | 31% |
| (ii) Anhydrous silicate Rm = 2 | 2.5% |
| (iii) Na$_2$SO$_4$ | 20% |
| (iv) H$_2$O | 45% |
| (v) Non-ionic C = 11 Oxyethylene group: 6 | ≈1.5% (5% with respect to the TPP) |

The same test as above was used, with a speed of rotation of 750 rpm, with the same materials.

TABLE IV

| TPP | Phase I | Maximum Viscosity | Viscosity in mV | | | Stabilization | δT Maximum |
| --- | --- | --- | --- | --- | --- | --- | --- |
| | | | 1 min | 5 min | 10 min | | |
| No. 2 | 87 | 100 at 13 min 30 | 35 | 70 | 93 | 100 | 13 at 1 min |
| No. 5 | 0 | 95 at 7 min 30 | 18 | 51 | 79 | 77 | 3 at 7 min 30 |
| No. 6 | 31 | 91 at 9 min | 21 | 46 | 83 | 80 | 3 at 7 min |

In order to demonstrate the influence of the level of concentration of non-ionic surfactant, TPP No. 2 was again used in the same formulation, which incorporated 4% of non-ionic substance (namely, non-ionic surfactant/TPP=12.9%), and in which the sulfate content was reduced to 17.5% (medium No. 2).

When using medium No. 2, the rate of hydration obtained was the same, and the maximum viscosity was 108 mV after a period of 16 minutes, which was slightly higher than that of medium No. 1 but which still evidenced a slurry that was completely sprayable.

If the speed of agitation was reduced to 300 rpm (weak shearing effect) for the same formulation, the maximum viscosity obtained was 110 at 15 minutes, that is to say, equivalent.

EXAMPLE 4

This example demonstrates the improvements in a TPP according to the invention, in association with a zeolite 4A as a detergency co-auxiliary (co-builder).

The procedure of this example used TPP No. 2 and a commercially available zeolite 4A, having a particle diameter of 3 μm, in the following medium:

| | |
| --- | --- |
| (i) Water | 100 g |
| (ii) Non-ionic; C = 17; OE = 25 | 1% |
| (iii) 1.5% prehydrated TPP | 25 g |
| (iv) Zeolite | 25 g |
| (v) Sodium sulfate | 17 g |

The medium was heated at 70° C. for a period of 30 minutes. The resulting slurry was then atomized at different temperatures which, in regard to the TPP produced, corresponded either to simple drying (TPP 6.H$_2$O) or to superdrying corresponding to 4 mols of residual water per mol of initial TPP.

TABLE V

| TPP | Degree of hydrolysis (or reversion) | |
| --- | --- | --- |
| | Drying | Superdrying |
| TPP* with 87% phase I not in accordance with the invention + zeolite | 16% | 61% |
| TPP No. 2 in accordance with the invention + zeolite | 12% | 35% |

*This TPP was produced by calcination of TPP No. 6 in a furnace at a temperature of 520° C.

These examples, therefore, clearly show that, irrespective of the hydration medium, with or without surfactant, and irrespective of the nature of the surfactant and the intensity of the shearing effect, the TPP according to the invention had a high rate of hydration, while at the same time having a rheology which made it easily sprayable.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. Anhydrous sodium tripolyphosphate, the X-ray diffraction pattern thereof essentially corresponding to a phase I sodium tripolyphosphate; the viscosity thereof, in aqueous medium, being below 1.5 m A; the rate of hydration thereof characterizing a phase I sodium tripolyphosphate; and which exhibit an ROH at 1 minute of greater than about 90° C.

2. The sodium tripolyphosphate as defined by claim 1, exhibiting an ROH at 1 minute of at least 95° C.

* * * * *